United States Patent
Lenox et al.

(10) Patent No.: US 8,424,255 B2
(45) Date of Patent: Apr. 23, 2013

(54) PV MODULE MOUNTING METHOD AND MOUNTING ASSEMBLY

(75) Inventors: Carl J. S. Lenox, Oakland, CA (US); Kurt M. Johnson, Richmond, CA (US)

(73) Assignee: SunPower Corporation, San Jose, CA (US)

( * ) Notice: Subject to any disclaimer, the term of this patent is extended or adjusted under 35 U.S.C. 154(b) by 778 days.

(21) Appl. No.: 11/776,316

(22) Filed: Jul. 11, 2007

(65) Prior Publication Data

US 2008/0000173 A1    Jan. 3, 2008

Related U.S. Application Data

(60) Provisional application No. 60/821,869, filed on Aug. 9, 2006.

(51) Int. Cl.
*E04D 13/18* (2006.01)
(52) U.S. Cl.
USPC .................................. 52/173.3; 52/747.1
(58) Field of Classification Search ............... 52/173.3, 52/747.1; 136/244; 126/621, 623
See application file for complete search history.

(56) References Cited

U.S. PATENT DOCUMENTS

| | | | |
|---|---|---|---|
| 1,893,481 A | 1/1933 | Adams | |
| 4,233,085 A | 11/1980 | Roderick et al. | |
| 4,426,813 A * | 1/1984 | Buzzi, Jr. | 52/27 |
| 5,456,433 A * | 10/1995 | Burns et al. | 248/148 |
| 5,571,338 A * | 11/1996 | Kadonome et al. | 136/251 |
| 5,603,187 A * | 2/1997 | Merrin et al. | 52/58 |
| 5,647,915 A | 7/1997 | Zukerman | |
| 5,740,996 A | 4/1998 | Genschorek et al. | |
| 5,746,029 A * | 5/1998 | Ullman | 52/27 |
| 6,046,399 A | 4/2000 | Kapner | |
| 6,105,317 A * | 8/2000 | Tomiuchi et al. | 52/173.3 |
| 6,111,189 A * | 8/2000 | Garvison et al. | 136/244 |
| 6,119,415 A | 9/2000 | Rinklake et al. | |
| 6,360,491 B1 * | 3/2002 | Ullman | 52/22 |
| 6,412,239 B1 * | 7/2002 | Miller | 52/204.1 |
| 6,465,724 B1 * | 10/2002 | Garvison et al. | 136/244 |
| 6,521,821 B2 | 2/2003 | Makita et al. | |

(Continued)

OTHER PUBLICATIONS

Office Action Mailed Jul. 30, 2009, in U.S. Appl. No. 11/776,272, filed Jul. 11, 2007, 15 pages.

(Continued)

*Primary Examiner* — Khoi Tran
*Assistant Examiner* — Jason Holloway
(74) *Attorney, Agent, or Firm* — Knobbe Martens Olson & Bear LLP

(57) ABSTRACT

A method for mounting PV modules to a deck includes selecting PV module layout pattern so that adjacent PV module edges are spaced apart. PV mounting and support assemblies are secured to the deck according to the layout pattern using fasteners extending into the deck. The PV modules are placed on the PV mounting and support assemblies. Retaining elements are located over and secured against the upper peripheral edge surfaces of the PV modules so to secure them to the deck with the peripheral edges of the PV modules spaced apart from the deck. In some examples a PV module mounting assembly, for use on a shingled deck, comprises flashing, a base mountable on the flashing, a deck-penetrating fastener engageable with the base and securable to the deck so to secure the flashing and the base to the shingled deck, and PV module mounting hardware securable to the base.

20 Claims, 9 Drawing Sheets

U.S. PATENT DOCUMENTS

| | | | |
|---|---|---|---|
| 6,584,737 B1* | 7/2003 | Bradley, Jr. | 52/173.3 |
| 6,672,018 B2* | 1/2004 | Shingleton | 52/173.3 |
| 6,786,012 B2* | 9/2004 | Bradley, Jr. | 52/173.3 |
| 6,809,251 B2 | 10/2004 | Dinwoodie | |
| 6,959,520 B2 | 11/2005 | Hartman | |
| 6,962,591 B2 | 11/2005 | Lerch | |
| 7,155,870 B2 | 1/2007 | Almy | |
| 7,175,140 B2* | 2/2007 | Johnson et al. | 248/148 |
| 7,406,800 B2* | 8/2008 | Cinnamon et al. | 52/173.3 |
| 7,434,362 B2* | 10/2008 | Liebendorfer | 52/173.3 |
| 7,592,537 B1 | 9/2009 | West | |
| 2003/0005651 A1* | 1/2003 | Miller | 52/204.1 |
| 2003/0015636 A1 | 1/2003 | Liebendorfer | |
| 2003/0070368 A1* | 4/2003 | Shingleton | 52/173.3 |
| 2003/0094193 A1 | 5/2003 | Mapes et al. | |
| 2003/0101662 A1* | 6/2003 | Ullman | 52/27 |
| 2005/0126621 A1 | 6/2005 | Dinwoodie et al. | |
| 2006/0000178 A1* | 1/2006 | Almy | 52/543 |
| 2006/0042683 A1 | 3/2006 | Gangemi | |
| 2006/0053706 A1* | 3/2006 | Russell | 52/173.3 |
| 2006/0156648 A1* | 7/2006 | Thompson et al. | 52/173.3 |
| 2007/0248434 A1 | 10/2007 | Wiley et al. | |

OTHER PUBLICATIONS

RoofJack PV Module Mounting System; developed in 1985.
Schott Sun Roof FS Mounting System Marketing Materials, 2002, 2 pp.
International Search Report dated Oct. 30, 2008 from corresponding International Application No. PCT/US07/74813; 13 pages.
Smith Electric Company, The story of our purchase, installation and maintenance of a grid-connected home solar electricity system, in "Solar Energy," May 3, 2004, 30 pages.

* cited by examiner

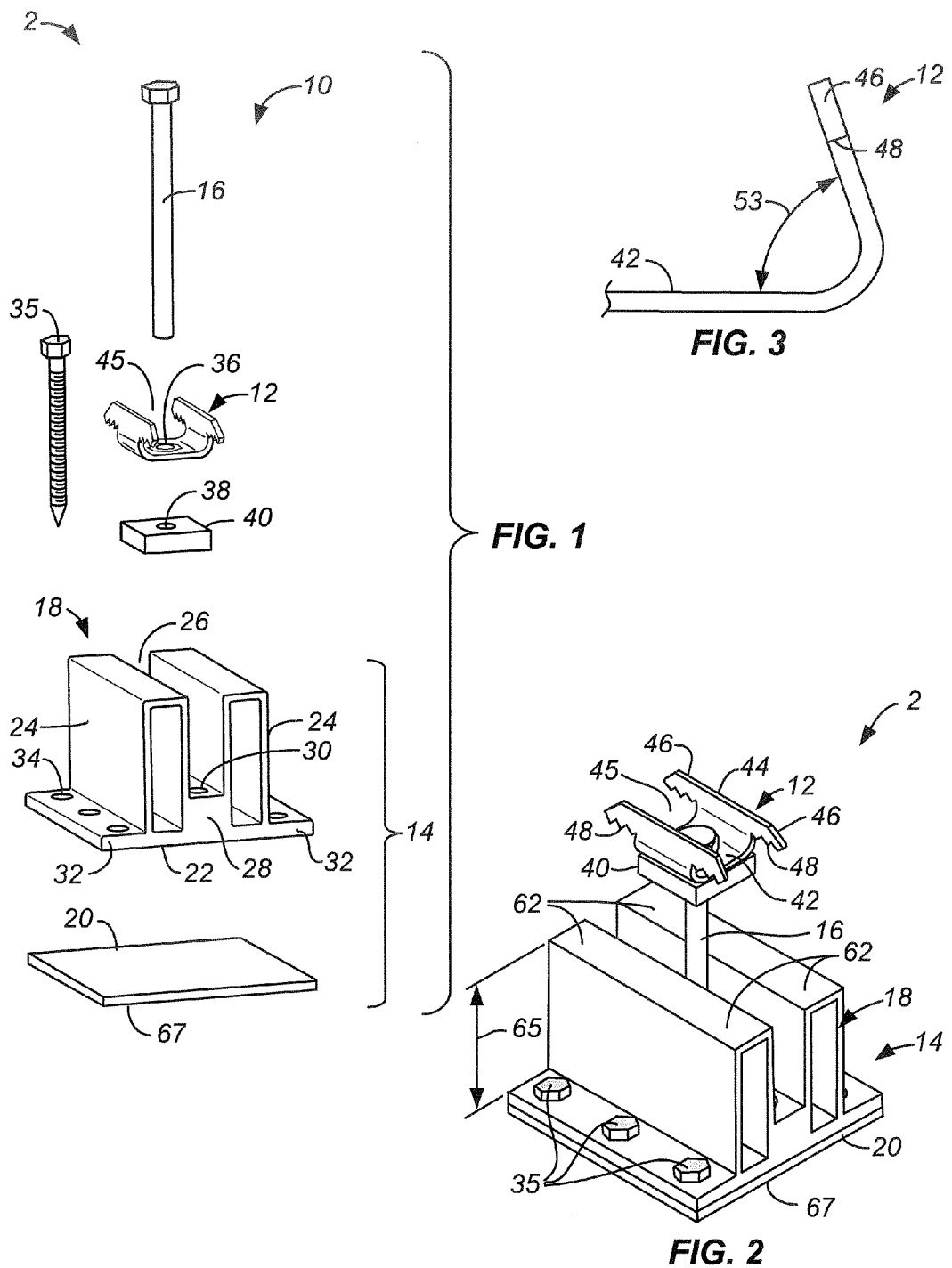

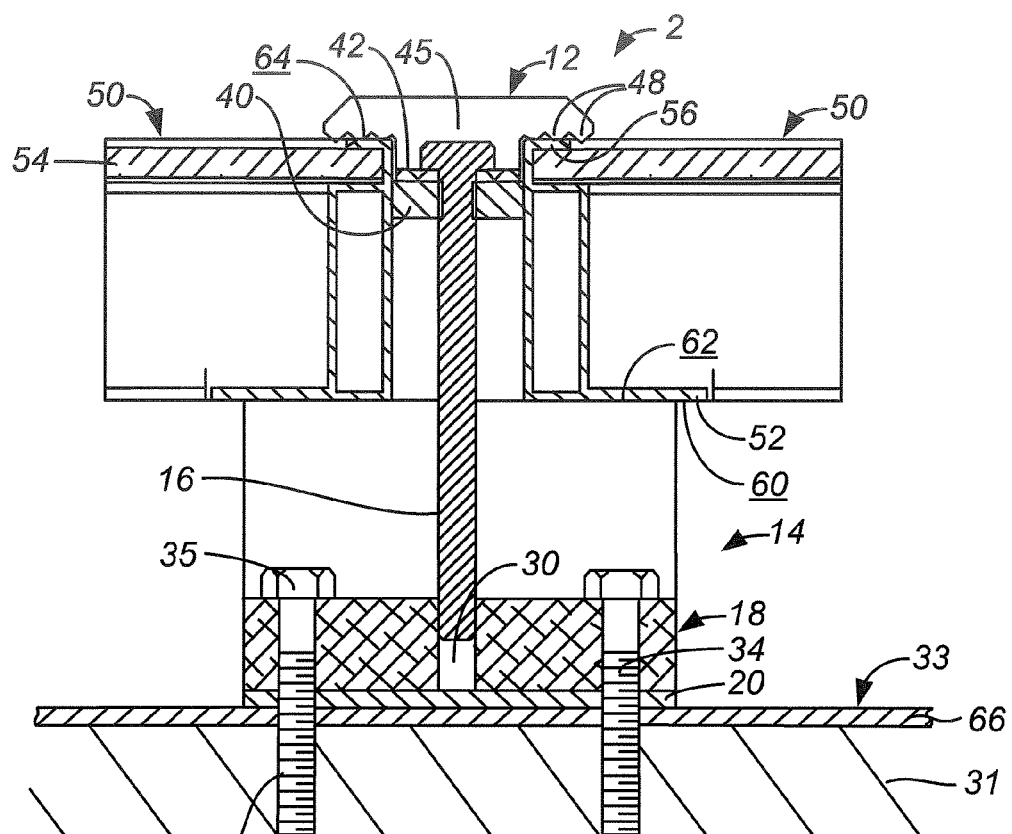
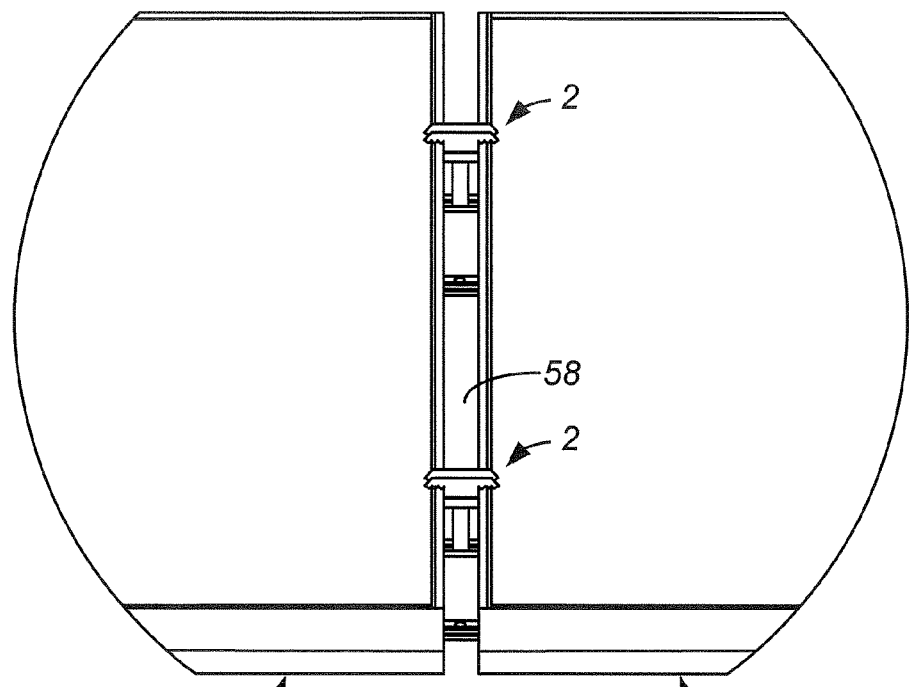

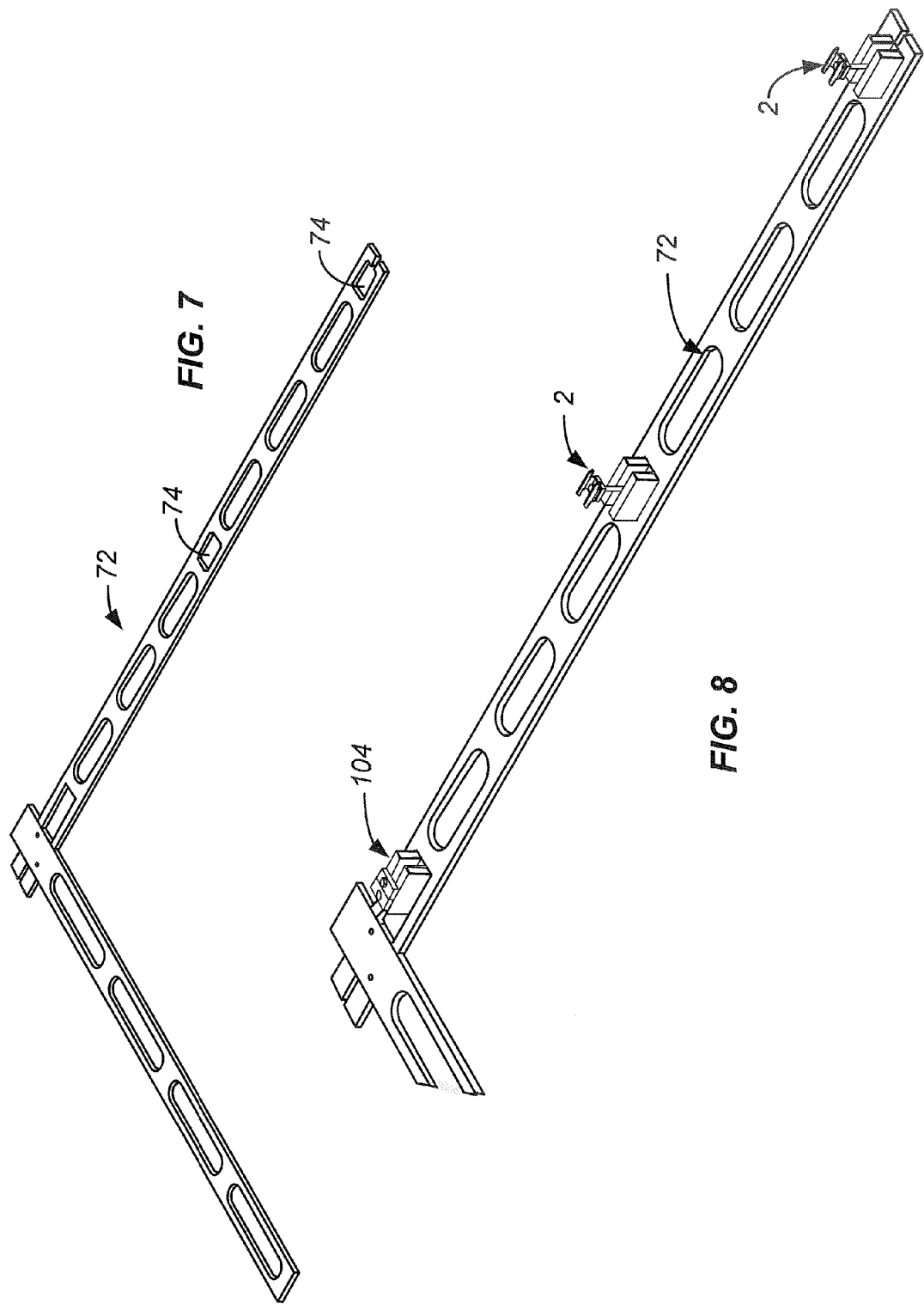

PV MODULE MOUNTING METHOD AND MOUNTING ASSEMBLY

CROSS-REFERENCE TO OTHER APPLICATIONS

This application claims the benefit of provisional patent application No. 60/821,869 filed 9 Aug. 2006.

STATE SPONSORED RESEARCH OR DEVELOPMENT

This invention was made with State of California support under California Commission Agreement Number 500-04-022. The Energy Commission has certain rights to this invention.

This application is related to U.S. application patent Ser. No. 11/776,272 filed on the same day as this application, entitled PV Module Mounting and Support Assembly and Installation.

BACKGROUND OF THE INVENTION

A typical method of securing PV modules to roofs using a wood deck is with a rack system including vertical stanchions and lateral rails. The vertical stanchions are often lag bolted into joists, which are typically on 24" (61 cm) centers. Conical flashings, similar to the type used for ventilation pipes, are used to waterproof these penetrations. In some cases flashings are not used and "L" brackets or other mounting hardware is lag bolted directly through the roofing material, with the penetration caulked with sealant. Then lateral rails are attached to the stanchions, typically several inches off the roof to allow clearance for the flashings. PV modules are then attached to the rails. Reasons for using the vertical stanchions and a lateral rails approach include: PV modules are not typically designed in convenient widths relative to joist spacing, not all PV modules have geometries amenable to direct-deck mounting, and the racks are designed to accommodate generally any PV module. In most cases framed PV modules are mounted in this manner but methods to mount unframed PV modules to racks do exist.

In another method for securing PV modules to roofs, the PV modules are typically lag bolted into blocking members installed between rafters in the attic; other mounting hardware can also be used. Relatively large holes must often be pre-drilled through the roofing material to accommodate the mounting hardware. Because of the size of these larger holes and the configuration of the module, it is often difficult to tell if adequate waterproofing has been achieved. If blocking is used, the process of installing blocking involves extensive work in the attic which adds significantly to installation time.

A further method for securing PV modules to roofs uses a hold down device that can only be used with specially constructed PV modules having complementary hold down structure, such as laterally extending hold down pins.

BRIEF SUMMARY OF THE INVENTION

An example of a method for mounting first and second PV modules to a support structure, the support structure of the type comprising a deck, is carried out as follows. First and second PV modules are selected. Each PV module has upper and lower sides and edge segments defining a peripheral edge, the peripheral edge having upper and lower peripheral edge surfaces. A layout pattern for the first and second PV modules is selected so that a chosen edge segment of the first PV module will lie adjacent to but spaced apart from a chosen edge segment of the second PV module. A plurality of PV mounting and support assemblies are positioned at selected locations according to the layout pattern. Each PV mounting and support assembly comprises a base, a fastener and PV module mounting hardware. The base comprises a lower base surface and a PV module-support surface, the PV module-support surface located a chosen distance above the lower base surface. The fastener is engageable with the base and penetrable into the deck with the lower base surface facing the deck. The PV module mounting hardware is securable to the base. The PV module mounting hardware comprises a retaining element. Each PV mounting and support assembly is secured to the selected locations using the fasteners to engage the base and to extend into the deck with the lower base surface facing the deck. The first and second PV modules are positioned in the layout pattern and the first and second PV modules are placed on the PV module-support surfaces. Retaining elements are located over the upper peripheral edge surfaces of the first and second PV modules. The retaining elements are secured against the upper peripheral edge surfaces so to secure the first and second PV modules to the deck with the peripheral edges of the PV modules spaced apart from the deck. In some examples the layout pattern is selected without a need for the layout pattern to be aligned with any deck-supporting structure.

An example of a PV module mounting assembly, for use on a shingled support surface of the type having a deck on which shingles are mounted, comprises flashing, a base, a deck-penetrating fastener and PV module mounting hardware. The base is mountable to the flashing. The deck-penetrating fastener is engageable with the base and securable to the deck so to secure the flashing and the base to the shingled support surface. The PV module mounting hardware is securable to the base. In some examples a sealing layer is used between the upper flashing surface and the base.

An example of a PV module installation comprises an inclined shingled support surface, flashing, a base, a deck-penetrating fastener, means for sealing holes and PV module mounting hardware. The inclined shingled support surface comprises a deck on which upper and lower rows of shingles are mounted. The flashing has upper and lower flashing edges. The flashing is supported on the lower row of shingles with the upper flashing edge positioned beneath the upper row of shingles. The base is supported on the flashing. The deck-penetrating fastener passes through the flashing and into holes in the deck so to secure the flashing and base plate to the shingled support surface. Means are used to seal the holes in the deck. The PV module mounting hardware is securable to the base.

An advantage of the invention is that it is suitable for use with a number of different conventionally designed PV modules. The PV modules do not need any special hold down or attachment structures for use with various examples of this invention. In addition, the size of the modules does not depend on the spacing of the joists or other structure supporting the deck. Installation typically does not require access to an attic area for installation of blocking (which is not needed) or inspections. Some examples of the invention significantly reduce part count over conventional mounting systems, for example by eliminating the need for mounting rails, which reduces cost and installation complexity. In addition, some examples help to significantly reduce installation time, which also reduces cost. Additionally, some examples allow very low profile securement of the PV modules to the roof or other support structure. In some examples the PV modules can be mounted nearly flush to the support structure, consistent with proper airflow for cooling, which improves the aesthetics significantly. The region beneath the PV module can typically be fluidly coupled to the region above the module. Wind tunnel tests may be carried out to determine the parameters that would result in, for example, pressure equalization between the upper and lower surfaces, thus providing for reduced loads on the PV modules under different wind conditions. Wind loading on photovoltaic modules is discussed in more detail in U.S. patent application Ser. No. 10/922,117 filed Aug. 19, 2004 and entitled PV Wind Performance Enhancing Methods and Apparatus, US Patent Publication Number US-2005-0126621-A1 published Jun. 16, 2005. In some examples the mounting structure can incorporate both a hold down (mounting) function and an electrical grounding function to substantially eliminate the need for additional grounding structure. Some examples of the PV mounting and support assemblies permit adjacent PV modules to be placed relatively close to one another. This not only improves aesthetics but also increases the energy output for a given area of the roof or other support structure. By positioning deck-penetrating fasteners beneath the PV modules, uplift forces are essentially tension only; this is in contrast with some conventional PV module hold down structures in which the deck-penetrating fasteners are laterally offset from the PV modules resulting in both tension and bending forces on the fasteners.

Other features, aspects and advantages of the present invention can be seen on review of the figures, the detailed description, and the claims which follow.

BRIEF DESCRIPTION OF THE DRAWINGS

FIG. 1 is an exploded isometric view of a PV mounting and support assembly with only a single deck-penetrating fastener shown for clarity;

FIG. 2 is an assembled isometric view of the assembly of FIG. 1;

FIG. 3 is an enlarged partial side view of the clip of FIG. 1;

FIG. 4 is an enlarged cross-sectional view of the assembly of FIG. 2 shown securing adjacent PV assemblies to the deck of a support structure;

FIG. 5 is a simplified overall view of two adjacent PV assemblies secured to one another using the assembly FIGS. 1-4;

FIG. 7 shows a layout tool used to properly position the assemblies of FIG. 2 on the support structure;

FIG. 8 illustrates the layout tool of FIG. 7 positioning two of the assemblies of FIG. 2 and one of the internal PV mounting and support assemblies of FIGS. 12-14;

DETAILED DESCRIPTION OF THE INVENTION

Figure 6:
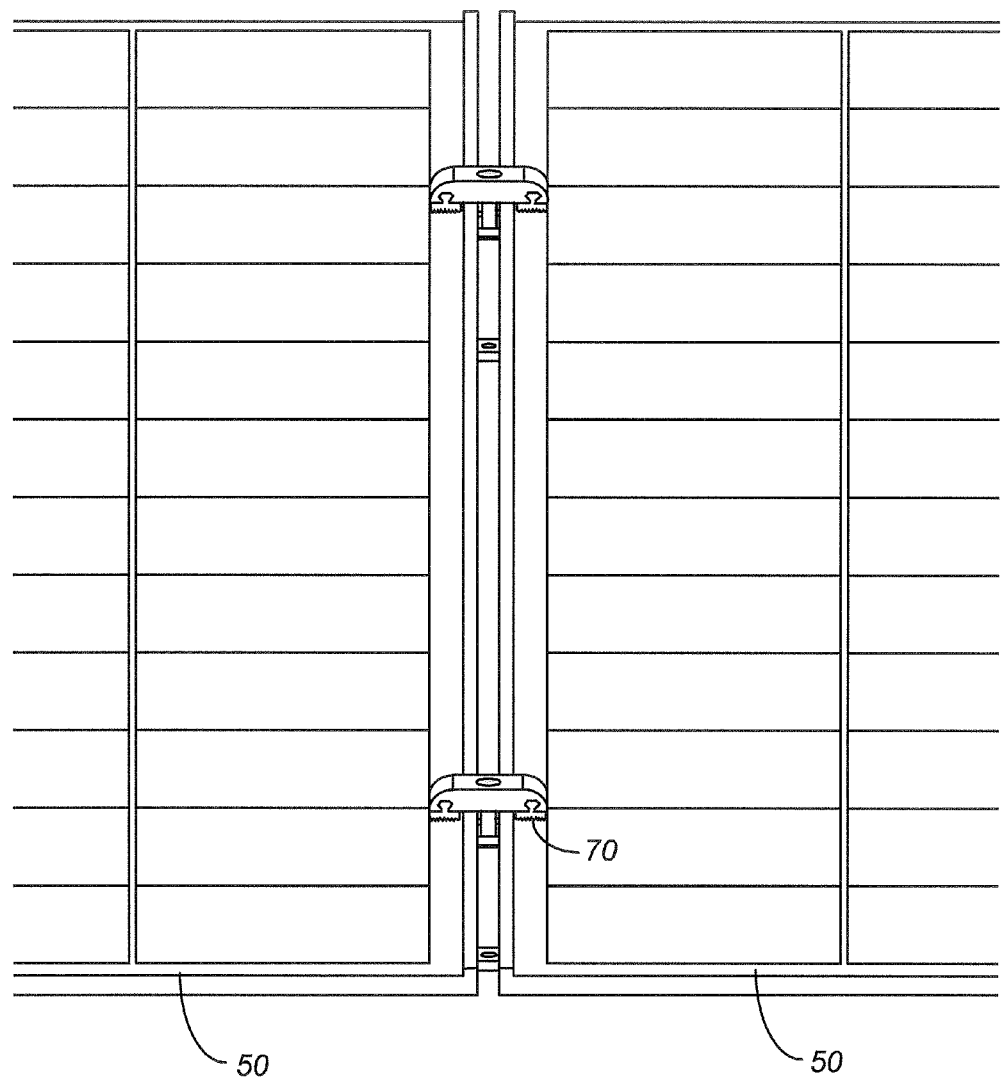
FIG. 6 is a view similar to that of FIG. 5 shown using surface-cushioning members engaging frameless PV modules.

The following description will typically be with reference to specific structural embodiments and methods. It is to be understood that there is no intention to limit the invention to the specifically disclosed embodiments and methods but that the invention may be practiced using other features, elements, methods and embodiments. Preferred embodiments are described to illustrate the present invention, not to limit its scope, which is defined by the claims. Those of ordinary skill in the art will recognize a variety of equivalent variations on the description that follows. Like elements in various embodiments are commonly referred to with like reference numerals.

FIG. 1 is an exploded isometric view of one example of a PV mounting and support assembly 2 made according to the invention. Assembly 2 includes a clip assembly 10 and a base 14. Clip assembly 10 includes a clip 12 secured to base 14 by a bolt 16. Base 14 includes a base body 18, typically of extruded aluminum or some other appropriate material, and a sealant 20 secured to the lower surface 22 of base body 18. Sealant 20 is typically in the form of a butyl tape about 3 mm thick. Base body 18 has a pair of raised portions 24 defining a gap 26 therebetween. Gap 26 extends down to a central region 28 of base body 18, central region 28 having a threaded hole 30 formed therein for receipt of bolt 16 Central region 28 may include one or more clearance holes for additional screws 35. Base body 18 also has a pair of flanges 32 having a number of mounting holes 34 used to secure base 14 to the deck 31 of a support structure 33, such as a roof, with deck-penetrating fastener 35. See FIG. 4. Bolt 16 passes through a central opening 36 in clip 12, through a hole 38 formed in a spacer 40, through gap 26, and into a threaded hole 30. Other types and configurations for base body 18, such as a solid block without a gap 26 or flanges 34, may also be used.

FIGS. 4 and 5 show clip assemblies 10 securing adjacent PV modules 50, also called PV assemblies 50, to base body 18. Clip assemblies 10 are shown engaging adjacent PV assemblies 50 with screws 16 in the gap 58 between the PV assemblies. Assemblies 2 are commonly referred to as interior assemblies when used between adjacent PV assemblies. PV assemblies 50 include a peripheral frame 52 supporting a PV panel 54. Frame 52 includes a lower peripheral edge surface 60 which is biased against the PV module support surface 62 of the base body 18 by virtue of clip 12 pressing against the upper peripheral edge surface 64 of frame 52. The distance 65 between support surface 62 and a lower base surface 67 of base 14 is typically chosen by the desired distance between lower peripheral edge surface 60 and support structure 33. Support structure 33 typically includes deck 31 covered by a weather barrier layer 66.

In one embodiment deck-penetrating fasteners 35 are typically self tapping screws 35 between the size of #8 and #14 (M4-M6), and of sufficient length to fully engage with deck 31 and create penetrations or holes 68 therein. Deck 31 is typically 15/32" (12 mm) thick oriented strand boards (OSB) or ½" (12 mm) thick plywood or similar materials, on which shingles or other materials to create weather barrier layer 66 are mounted, formed or applied. It is preferably that holes 34 be situated on flange 32 such that the head of each screw 35 does not protrude above the top surface of flanges 32. In one embodiment weatherproofed screws with sealing washers beneath the head are used in addition to sealant 20. In some embodiments sealant 20 may be eliminated when other means for sealing the holes in deck 31 are used, such as a liquid sealant. In some embodiments screw 16 is a ¼"-20 (M6) stainless steel screw. A variety of clip or clamp devices, in addition to those described herein, may be used to secure PV assembly 50 to base 14.

PV assembly 50 has a structural frame 52, but may be an unframed PV laminate, or may be framed in a material that provides only protection of the edge of the PV laminate without significant structural function. This material may be nonconductive. An example of a frameless PV module 50 is shown in FIG. 6. PV mounting and support assembly 2 of FIG. 6 differs from assembly 2 of FIGS. 1-5 primarily by the use of surface-cushioning members 70 between clips 12 and upper peripheral edge surface 64 of PV assembly 50. Such a surface-cushioning member could be supplemented by or replaced by a force-distributing plate or strip which may be secured to clip 12 or PV assembly 50 or simply located between the two.

Clip 12 is a generally U-shaped structure having a central portion 42, through which central opening 36 is formed, and a pair of upstanding arms 44. Arms 44 and central portion 42 define an access region 45. Access region 45 is accessible from above to provide clear access to screw 16 thus facilitating the use of clip assembly 10. Arms 44 include extensions 46 having downwardly extending teeth 48. As shown in FIG. 3, clip assembly 10 is used with PV assemblies 50 of the type having electrically conductive frames 52 surrounding PV panels 54. As can be seen in FIGS. 2 and 3, the head of screw 16 is located completely within access region 45 and is located below the top surface of frame 52 of PV assembly 50. In addition, the generally T-shaped configuration of arms 44 with downwardly facing teeth 48 provide for a low profile structure. This low profile structure creates a cleaner, less cluttered appearance and also minimizes shading of PV panel 54.

Frames 52 have an upper, circumferentially extending edge 56 which are engaged by teeth 48 of clip 12. Frame 52 is typically anodized aluminum and thus has a non-conductive outer surface. Frame 52 may also have other types of nonconductive outer surfaces, such as a painted outer surface. To ensure good electrical contact between clip 12 and frame 52, teeth 48 act as surface-disrupting elements. The serrated teeth or other structure cuts through any nonconductive material on frame 52 thereby creating a positive electrical connection with clip 12, and via screw 16, to base 14. This helps to ensure good grounding between frames 52 of adjacent PV assemblies 50 through clip 12. Other surface-disrupting methods could also be used, such as causing clip 12 to slide against and score a portion of frame 52 or through the use of other types of surface-disrupting structures or procedures.

In the example of FIGS. 1-5, three teeth 48 are used at each extension 46 of arms 44. The use of a number of points 44 at each extension 46 allows some adjustment in the position of clip 12 relative to frame 52, thus facilitating installation. Teeth 48 are oriented to be generally parallel to a line connecting extensions 46 of each arm 44 and thus generally perpendicular to the adjacent frame 52.

Arms 44 are preferably not perpendicular to central portion 42. In the disclosed example, arms 44 extend inwardly over central portion 42 to define an included angle 53, see FIG. 3. Included angle 53 is an acute angle and typically ranges from 80-88°, and is about 83° in the disclosed example. This helps to strengthen clip 12 because arms 44 will tend to straighten out under load. Another advantage with the angulation of arms 44 is that doing so results in more of a point contact by teeth 48 with frame 52. This can be for two primary reasons. The first reason is that teeth 48, for practical purposes, do not narrow down to a true point but rather to a line or edge, the length of which is as long as clip 12 is thick. Therefore, by angling arms 44, the ends of teeth 48 first engage frame 52 to provide more of a point contact than a line contact. The second reason is based upon the fact that manufacturing constraints limit how sharp of an edge teeth 48 will exhibit. In some examples, teeth 48 will exhibit a rounded edge so that if arms 44 were perpendicular to central portion 42, teeth 48 would provide a generally cylindrical surface against frame 52.

Clip 12 also secures frame 52 to base 14 by capturing the frame between arms 44 of clip 12 and support surface 62 of raised portions 24 of base body 18. Spacer 40, as suggested in FIG. 3, helps to ensure adjacent PV assemblies 50 are located in a proper distance from one another. Spacer 40 is typically made of rubber or some other material including, for example, metal or cardboard, sized to be larger than the width of central portion 42, illustrated in FIG. 3. The size of spacer 40 is chosen so that when PV assemblies 50 expand during hot weather, or otherwise, PV assemblies 50 have room to expand before contacting clip 12. This helps to prevent damage to PV panels 54, which could occur if PV assemblies 50 were to press directly against clip 12 during such thermal expansion. The use of spacer 40 simplifies installation and by eliminating the need to use a special tool to ensure proper spacing of PV assemblies during installation. Although the primary grounding created by clip 12 is from frame 52 of one PV assembly 50 to frame 52 of an adjacent PV assembly, clip assembly 10 can also be used to provide grounding between PV assembly frames 52 and base 14. Although not presently preferred because it may require a specially designed frame 52, in some examples clip 12 may be attached to or an integral portion of frame 52.

Assemblies 2 are typically secured to deck 31 of support structure 33 based upon a layout pattern for PV assemblies 50. After the layout pattern has been chosen, assemblies 2 are located at selected locations according to the layout pattern so that the assemblies are properly positioned to engage the edges of one or more PV assemblies 50. Although this could be carried out using PV assemblies 50 as a positioning fixture, it is preferably carried out with the aid of a layout tool, such as layout tool 72 shown in FIGS. 7 and 8. Layout tool 72 has appropriately located openings 74 size to properly position assemblies 2, see FIG. 8, at appropriate orientations and spacing. Layout tool 72 helps to accurately position assemblies 2 in two axes. In some examples layout tools may be used to locate guide holes or mounting holes for the proper location of assemblies 2.

Figure 9:
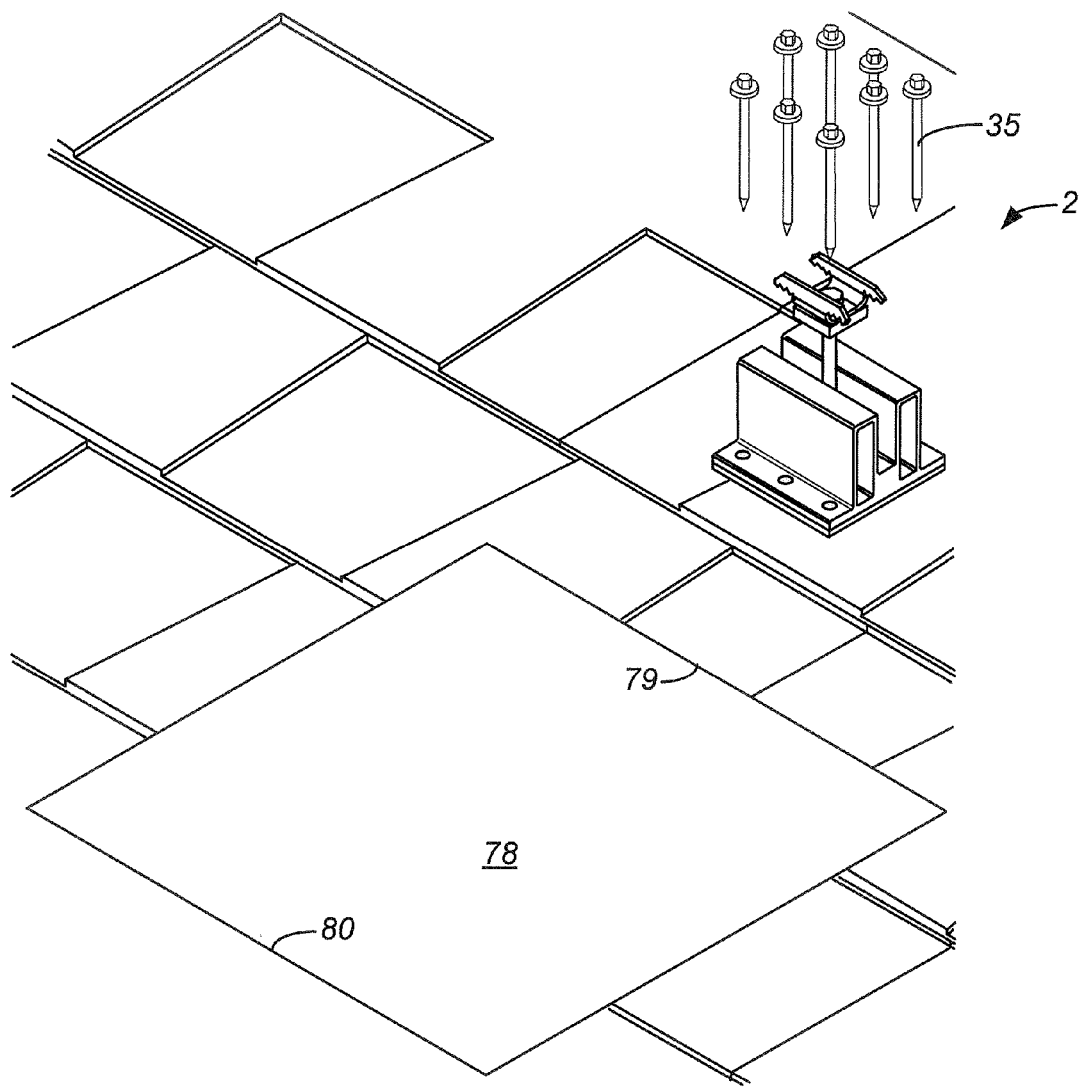
FIG. 9 is a partially exploded isometric view of flashing and the assembly of FIGS. 1 and 2 above a shingled support structure.
Figure 10:
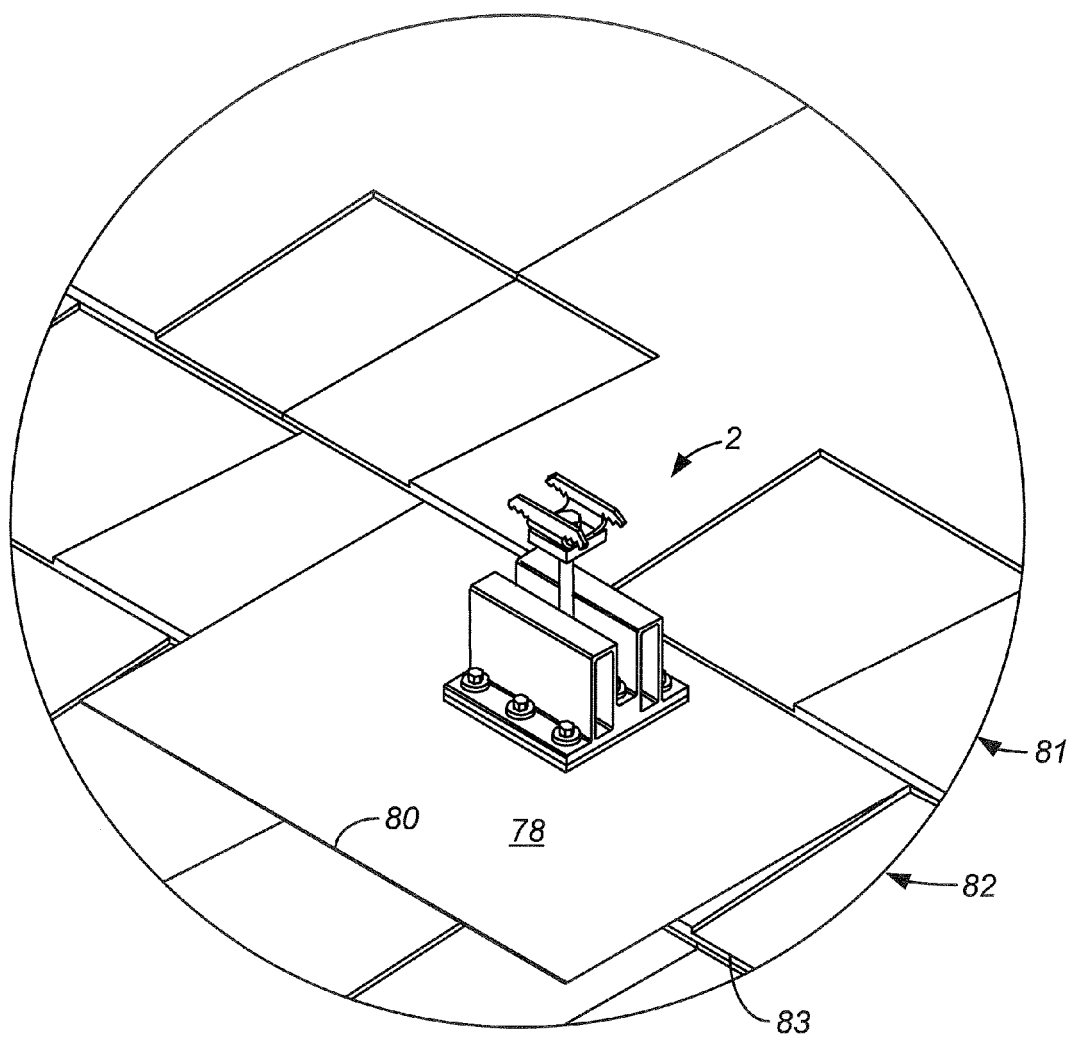
FIG. 10 shows the structure of FIG. 9 with the PV mounting and support assembly secured to the flashing, the flashing supported on a lower row of shingles and extending beneath an upper row shingles.

FIGS. 9 and 10 illustrate mounting PV mounting and support assembly 2 on top of a shingled support structure 76 with flashing 78 between assembly 2 and shingled support structure 76. Flashing 78 has upper and lower edges 79, 80 with upper edge 79 extending beneath an upper row 81 of shingles and lower edge 80 extending past the lower edge 83 of a lower row 82 of shingles. Flashing 78 is used to waterproof penetrations 68 into deck 31. The use of flashing 78 in this manner is advantageous because it provides a smooth and consistent surface for the typically elastomeric sealing material of sealant 20 to seal against. Because flashing 78 covers a relatively large area, 1 square foot (929 cm$^2$) in one example, and is fastened tightly to the support structure 33, it discourages water infiltration to the area of penetrations 68, especially by wind-driven rain, and facilitates the shedding of water downwardly. Flashing 78 may be used in conjunction with liquid-applied roofing sealants to further protect penetrations 68 from any water infiltration. Flashing 78 may not be needed when the water shedding layer of support structure 33 is of a type, such as a metal roof, that waterproofing the deck screw penetrations can be made without the use of flashing. For example, with metal roofs sealant 20 may provide sufficient waterproofing. With an asphalt or composition shingle roof, base body 18 may be mounted directly to the shingled weather barrier layer 66 with penetrations 68 sealed using an appropriate sealing composition, alone or in combination with sealant 20, between the base plate and the shingle surface. In one example flashing 78 is galvanized or Galvalume coated steel. Flashing 78 may be any suitable sheet metal material or fabricated from plastic, composite or elastomeric materials. Flashings 78 may be pre-attached to base 14 rather than field-installed. In some examples shims, not shown, may be used to correct for undulations in support structure 33 so that the PV assemblies 50 remain generally coplanar.

Figure 11:
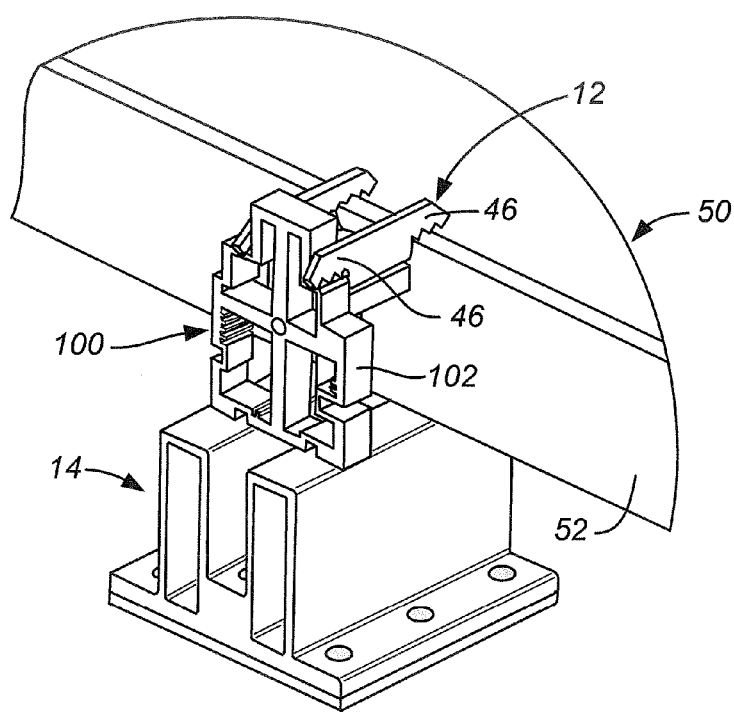
FIG. 11 shows the assembly of FIGS. 1 and 2 used at the periphery of a PV array with a spacer.

Clip assembly 10 of FIGS. 1 and 2 can be used at the periphery by using, for example, a spacer 100 located between the otherwise unused extensions 46 of clip 12, see FIG. 11, and the base 14. Spacer 100 is used to ensure that the force exerted by clip 12 is straight down on PV assembly 50 and to keep clip 12 properly engaged with the PV assembly. Spacer 100 has a periphery 102 configured to accommodate frames 52 having different heights. Other types of variable-height of spacers, including threaded, telescoping spacers and spacers consisting of stacks of individual spacer elements, can also be used.

Figure 12:
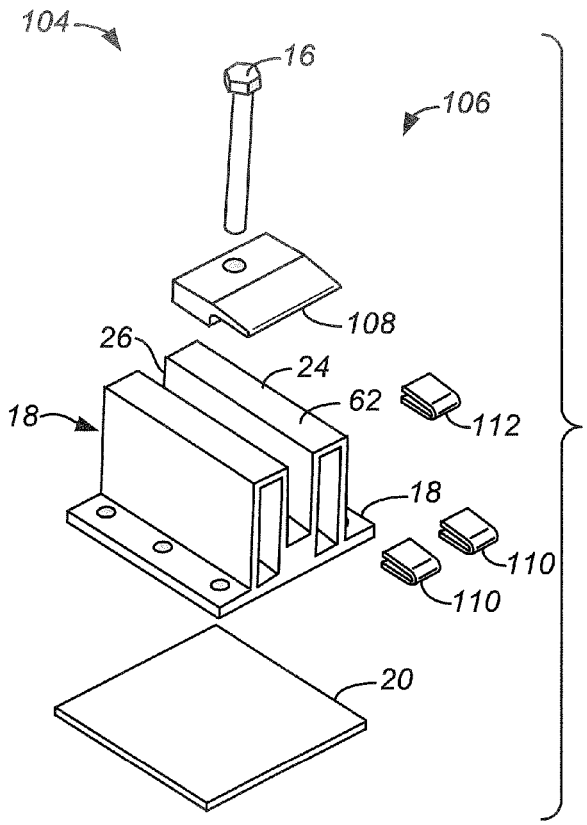
FIGS. 12 and 13 are exploded isometric and isometric views of an internal PV mounting and support assembly.
Figure 13:
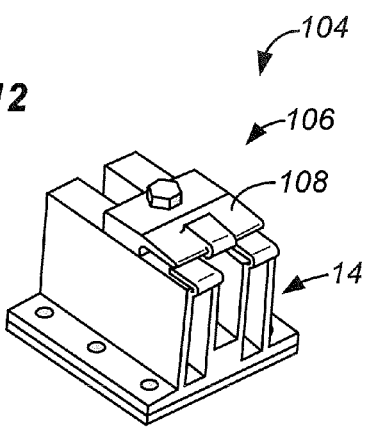
Figure 14:
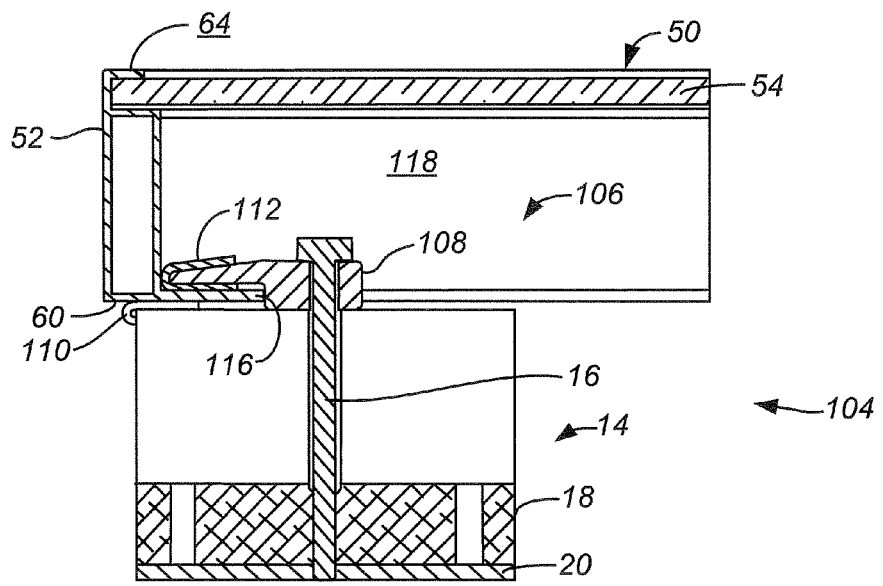
FIG. 14 is a cross-sectional view showing the assembly of FIG. 13 secured to the internal lip of the frame of a PV assembly.

FIGS. 12-14 illustrate an internal photovoltaic mounting and support assembly 104 including an internal clip assembly 106 designed as a modification of clip assembly 10 of FIGS. 1 and 2. Clip assembly 106 includes a clip 108 and pieces of electrically insulating adhesive-backed tape 110, 112. Tape 110 is secured to raised portions 24 of base body 18 to cover support surface 62. Tape 112 is adhered to clip 108 as shown in FIGS. 12 and 13 to lie above gap 26. A gap 113 is formed between clip 108 and support surface 62. Screw 16 is tightened onto base body 18 and then PV assembly 50 is secured to clip assembly 106 by sliding an internal lip 116 of frame 52 into gap 113 between clip 108 and base body 18 and between insulating tape 110, 112. This is possible because of the open region 118 defined by PV panel 54 and peripheral frame 52. Tape 110, 112 helps to ensure the snug engagement of lip 116 between clip 108 and base body 18 and also helps to reduce marring of the surface of lip 116. The size of gap 113, the thickness of internal lip 116, and the thickness and physical characteristics of tape 110, 112 are chosen to permit the internal lip to slide into and out of gap 113 while snugly engaging the internal lip.

In this example internal PV mounting and support assembly 104 acts to secure PV assembly 50 in place but does not necessarily provide a grounding function. In other examples internal clip assembly 106 could be configured to provide a grounding function as well as a mounting function by, for example, causing a spike to pierce the surface of lip 116 when the lip is inserted between clip 108 and base body 18. Although tape 110, 112 is in this example electrically insulating, it need not be.

Internal PV mounting and support assembly 104 may be used in conjunction with PV mounting and support assembly 2 to secure one edge of PV assembly 50 to support structure 33 in less time than if all edges were secured to the support structure using assemblies 2. The positioning of two assemblies 2 and one assembly 104 is shown in FIG. 8.

Figure 15:
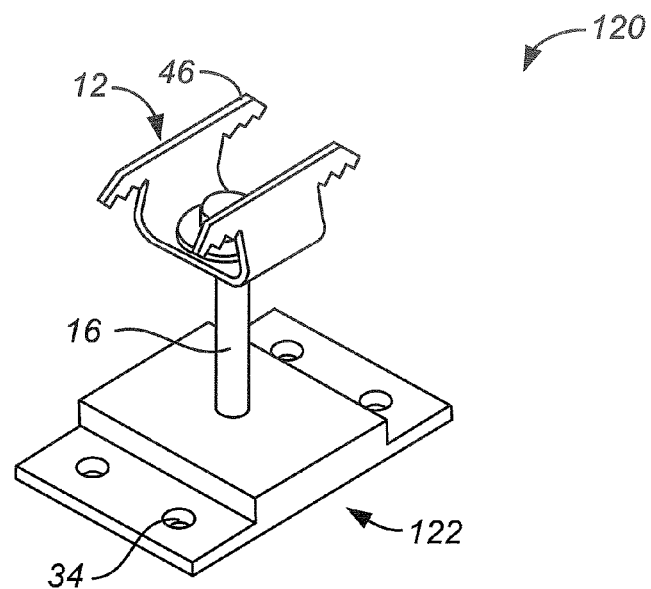
FIG. 15 is an isometric view of an example of a PV mounting assembly.
Figure 16:
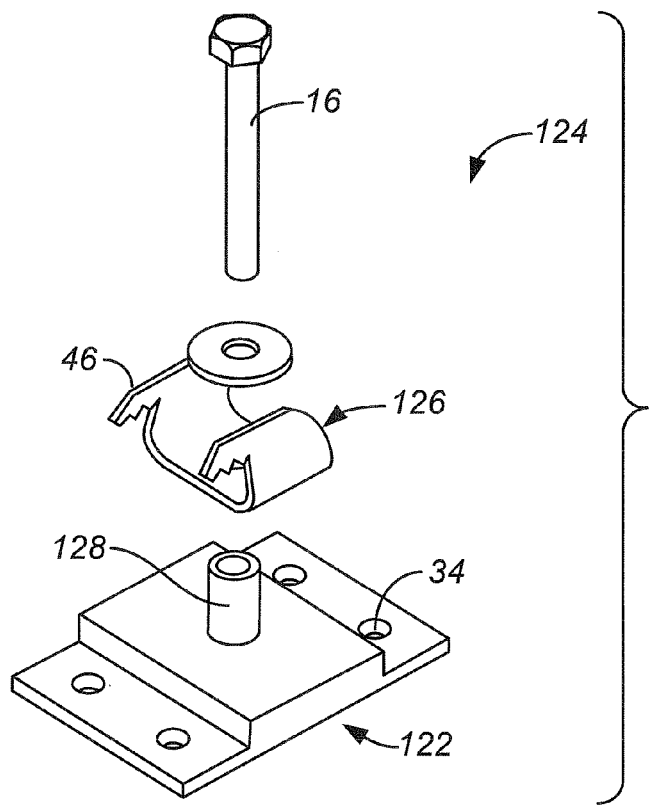
FIG. 16 is an exploded isometric view of an example of a peripheral PV mounting assembly using a standoff between the clip and the base body.

FIG. 15 illustrates a PV mounting assembly 120 typically used with the flashing 78 of FIGS. 9 and 10. Assembly 120 includes a base body 122 that does not have a PV module support surface 62 as do the above-described examples. Rather, separate structure 33 is used to raise PV assemblies 50 above support structure 33 if it is desired to do so. An appropriate sealing mechanism, such as sealant 20, is used with or as a part of assembly 120. FIG. 16 illustrates a peripheral PV mounting assembly 124 similar to that of FIG. 15 but including a peripheral mounting clip 126 having arms 44 extending to one side only. In addition, assembly 120 of FIG. 16 uses a standoff 128 between clip 126 and base body 122 to provide stability for assembly 121 when clip 126 is secured against a peripheral edge of a PV assembly 50.

The size of PV modules 50 that can be supported using PV support and mounting assemblies 2, 104 and PV mounting assemblies 120, 124 is dependent on the expected wind speed and exposure conditions as well as the construction of the underlying support structure. The disclosed examples can typically be used with PV modules 50 having a plan area of up to, for example, about 18 sq ft (1.67 m$^2$) for roofs and other support structures 33 constructed using conventional techniques. PV modules having larger plan areas may be accommodated but in some cases may require an adjustment of conventional construction practices and strengthening of the various mounting components.

Other contemplated implementations of this invention include the use screws made from other materials, or fasteners other than screws to secure base 14 to support structure 33. Countersunk fasteners can be used to avoid interference between frame 52 and the fasteners. Instead of a screw 16 engaging threaded hole 30, a different type of fastening device, such as a threaded stud, friction based connection, bayonet or twist-lock connection, push-on connector, ratchet fastener, or other similar device may be used. Instead of a butyl tape type of sealant 20, other materials for sealant 20 can be used; examples include an adhered rubber foot, a mechanically fastened rubber foot, foam tape, spray foam, butyl tape, cork, liquid adhesive or sealant, and a gasket. Base body 18 may be made by a variety of methods, including casting, molding, or machining and may be made from any suitable metal, plastic, composite, wood, or elastomeric material. In some examples base 14 may be integrated directly into the PV module 50 so that the bases and modules ship to site and are installed as a unit. In some examples base 14 may be integrated such that PV module frame 52 itself acts as the base and is secured directly to the roof deck. PV modules with bases integrated with the module frame may be constructed such that the frame design promotes airflow beneath the module even with the module fastened directly to the roof.

During installation mounting screw 16 may be torqued such that the threaded member and the clip are pre-loaded above the maximum code wind load plus an appropriate safety factor. This ensures a secure mechanical and electrical connection in all field conditions and excludes moisture from the ground bond area at teeth 48 by creating a high pressure connection zone around each point.

The use of threaded connections has been emphasized. However, other types of connections, such as a ratchet-type of connections and connections using spring fingers, may also be used.

The above descriptions may have used terms such as above, below, top, bottom, over, under, et cetera. These terms are used to aid understanding of the invention are not used in a limiting sense.

While the present invention is disclosed by reference to the preferred embodiments and examples detailed above, it is to be understood that these examples are intended in an illustrative rather than in a limiting sense. It is contemplated that modifications and combinations will occur to those skilled in the art, which modifications and combinations will be within the spirit of the invention and the scope of the following claims. Any and all patents, patent applications and printed publications referred to above are incorporated by reference.

What is claimed is:

1. A PV module mounting and support assembly, for use on a support structure of the type having a deck on which PV modules are to be mounted, comprising:
   a PV module;
   a base, having a lower surface, mountable to a deck;
   a deck-penetrating fastener engageable with the base and extendable into the deck so to secure the base to the deck, the lower surface facing the deck;
   the base comprising a PV module-support surface; and
   PV module mounting hardware comprising an elongated fastener and a retaining element securable to the base by the elongated fastener at a position spaced apart from and not in contact with the PV module-support surface, whereby an edge of the PV module is positioned on top of and is supported by the PV module-support surface with the edge of the PV module spaced apart from the deck and captured between the PV module-support surface and the retaining element, wherein the retaining element comprises a mounting clip securable directly to the base by the elongated fastener with the elongated fastener extending between and directly engaging the mounting clip and the base.

2. The assembly according to claim 1 wherein the fastener comprises a threaded fastener and the deck-penetrating fastener comprises a self-tapping screw.

3. The assembly according to claim 1 wherein the base comprises first and second raised portions on opposite sides of the elongated fastener, the first and second raised portions engageable with the same PV module.

4. The assembly according to claim 1 wherein the PV module-support surface comprises first and second PV module-support surfaces, whereby adjacent edges of adjacent PV modules can be positioned on top of and be supported by the first and second PV module-support surfaces with the elongated fastener extending between said adjacent edges.

5. The assembly according to claim 1 further comprising a deck hole sealing element associated with the deck-penetrating fastener, and wherein the deck hole sealing element comprises a sealing layer at the lower surface.

6. The assembly according to claim 1 further comprising flashing positionable between the lower surface and the deck.

7. PV module kit, for installation on a support structure of the type having a deck, comprising:
   a PV module having a peripheral edge, the peripheral edge having upper and lower peripheral edge surfaces, and a lower surface configured to be positioned toward the deck;
   a plurality of PV mounting and support assemblies configured to be positioned along the peripheral edge for securing the PV module to a deck of a support structure, each PV mounting and support assembly comprising:
      a base having a lower surface;
      a deck-penetrating fastener configured to engage the base and extend into the deck so to enable the base to be secured to the deck, the lower surface of the base configured to be facing the deck;
      the base comprising a PV module-support surface, the PV module-support surface comprising a pair of raised portions defining a gap therebetween and configured to extend beneath the lower peripheral edge surface for supporting the peripheral edge;
      the PV module-support surface located a chosen distance above the lower surface of the base; and
      PV module mounting hardware comprising an elongated fastener and a retaining element configured to be secured to the base by the elongated fastener at a position spaced apart from and not in contact with the base, the retaining element configured to be engaged with the peripheral edge of the PV module so the PV module is securable to the deck with the peripheral edge of the PV module spaced apart from the deck, the base configured to extend only part way across the lower surface of the PV module, wherein the retaining element comprises a mounting clip configured to be secured directly to the base by the elongated fastener with the elongated fastener extending between and directly engaging the mounting clip and the base.

8. The kit according to claim 7 wherein the retaining element is configured to be placed against and separated from the upper peripheral edge surface of the PV module.

9. The kit according to claim 7 for installation on a support structure of the type comprising spaced-apart deck support elements beneath a deck, the positions of the bases being independent of the positions of the deck support elements.

10. The kit according to claim 7 wherein
    the PV module comprises first and second PV modules configured to have adjacent peripheral edge portions positioned adjacent to one another.

11. The kit according to claim 10 wherein the PV module-support surface of at least one of the PV mounting and support assemblies comprises first and second PV module-support surfaces configured to be located beneath the adjacent peripheral edge portions with the elongated fastener configured to extend therebetween.

12. The kit according to claim 7 for installation on a support structure of the type comprising upper and lower rows of shingles mounted on the deck, and flashing having upper and lower flashing surfaces and upper and lower flashing edges, the flashing supported on the lower row of shingles with the upper flashing edge positioned beneath the upper row of shingles, and wherein:
    the base is configured to be mounted on the flashing.

13. A PV module kit, for installation on a support structure of the type having a deck, comprising:
    a PV module having a peripheral edge, the peripheral edge having upper and lower peripheral edge surfaces;
    a plurality of PV mounting and support assemblies configured to be positioned along the peripheral edge for securing the PV module to a deck of a support structure, each PV mounting and support assembly comprising:
       a base having a lower surface;
       a deck-penetrating fastener configured to engage the base and extend into the deck so to enable the base to be secured to the deck, the lower surface of the base configured to face the deck;
       the base comprising a PV module-support surface, the PV module-support surface comprising a pair of raised portions defining a gap therebetween and configured to extend beneath the lower peripheral edge surface for supporting the peripheral edge;
       the PV module-support surface located a chosen distance above the lower surface of the base; and
       PV module mounting hardware comprising an elongated fastener and a retaining element configured to be secured to the base by the elongated fastener at a position spaced apart from and not in contact with the base, the retaining element configured to engage with the peripheral edge of the PV module so the PV module is securable to the deck with the peripheral edge of the PV module spaced apart from the deck, the base configured to extend only part way across the lower surface of the PV module, wherein the PV module comprises a frame along the peripheral edge, wherein the retaining element comprises a mounting clip configured to be secured directly to the base by the elongated fastener with the elongated fastener extending between and directly engaging the mounting clip and the base; and wherein the frame is an electrically conductive frame and the retaining element is configured to make electrical contact with the electrically conductive frame.

14. The kit according to claim 7 wherein the PV module is at least substantially frameless at the peripheral edge and the retaining element comprises a surface-cushioning member configured to reduce localized stresses in the PV module.

15. A method for mounting first and second PV modules to a support structure, the support structure of the type comprising a deck, the method comprising:
  selecting first and second PV modules each having upper and lower sides and edge segments defining a peripheral edge, the peripheral edge having upper and lower peripheral edge surfaces, and each PV module having a lower surface positioned toward the deck;
  selecting a layout pattern for the first and second PV modules so that a chosen edge segment of the first PV module will lie adjacent to but spaced apart from a chosen edge segment of the second PV module;
  positioning a plurality of PV mounting and support assemblies at selected locations according to the layout pattern, each PV mounting and support assembly comprising:
    a base comprising a lower surface and a PV module-support surface, the PV module-support surface located a chosen distance above the lower surface;
    a deck-penetrating fastener engageable with the base and penetrable into the deck with the lower surface facing the deck; and
    PV module mounting hardware securable to the base, the PV module mounting hardware comprising a retaining element;
  securing each base to the selected locations using the deck-penetrating fasteners to engage the base and to extend into the deck with the lower surface facing the deck;
  positioning the first and second PV modules in the layout pattern and placing the first and second PV modules on the PV module-support surfaces;
  locating retaining elements over the upper peripheral edge surfaces of the first and second PV modules; and
  securing the retaining elements directly to the bases and against the upper peripheral edge surfaces without the retaining elements contacting the bases using elongated fasteners with the elongated fastener extending between and directly engaging the retaining elements and the bases, so to secure the first and second PV modules to the deck with the peripheral edges of the PV modules spaced apart from the deck, and each base extending only part way across the lower surface of the PV modules, wherein each of the retaining elements comprise a mounting clip.

16. The method according to claim 15 wherein the PV mounting and support assemblies positioning step is carried out with the aid of a layout tool.

17. The method according to claim 15 wherein the base securing step is carried out with the fasteners forming holes in the deck.

18. The method according to claim 15 wherein the layout pattern selecting step is carried out without a need for the layout pattern to be aligned with any deck-supporting structure.

19. A method for mounting first and second PV modules to a support structure, the support structure of the type comprising a deck, the method comprising:
  selecting first and second PV modules each having upper and lower sides and edge segments defining a peripheral edge, the peripheral edge having upper and lower peripheral edge surfaces, and each PV module having a lower surface positioned toward the deck;
  selecting a layout pattern for the first and second PV modules so that a chosen edge segment of the first PV module will lie adjacent to but spaced apart from a chosen edge segment of the second PV module;
  positioning a plurality of PV mounting and support assemblies at selected locations according to the layout pattern, each PV mounting and support assembly comprising:
    a base comprising a lower surface and a PV module-support surface, the PV module-support surface located a chosen distance above the lower surface;
    a deck-penetrating fastener engageable with the base and penetrable into the deck with the lower surface facing the deck; and
    PV module mounting hardware securable to the base, the PV module mounting hardware comprising a retaining element;
  securing each base to the selected locations using the deck-penetrating fasteners to engage the base and to extend into the deck with the lower surface facing the deck;
  positioning the first and second PV modules in the layout pattern and placing the first and second PV modules on the PV module-support surfaces;
  locating retaining elements over the upper peripheral edge surfaces of the first and second PV modules; and
  securing the retaining elements directly to the bases and against the upper peripheral edge surfaces without the retaining elements contacting the bases using elongated fasteners with the elongated fastener extending between and directly engaging the retaining elements and the bases, so to secure the first and second PV modules to the deck with the peripheral edges of the PV modules spaced apart from the deck, and each base extending only part way across the lower surface of the PV modules, wherein the PV modules selecting step comprises selecting framed PV modules, the frames being electrically conductive frames, and the second securing step is carried out so that the retaining elements make electrical contact with the electrically conductive frames, wherein each of the retaining elements comprise a mounting clip.

20. The method according to claim 15 wherein the PV modules selecting step comprises selecting substantially frameless PV modules with the PV modules being at least substantially frameless at the peripheral edges, and the PV mounting and support assemblies positioning step is carried out with the retaining elements comprising a surface-cushioning members between the retaining elements and the upper peripheral edge surfaces to reduce localized stresses in the PV module.

* * * * *